United States Patent [19]

Bennin et al.

[11] Patent Number: 5,160,823
[45] Date of Patent: Nov. 3, 1992

[54] MOVING MASK LASER IMAGING

[75] Inventors: Jeffry S. Bennin; Mark O. Dustrude, both of Hutchinson, Minn.

[73] Assignee: Hutchinson Technology, Inc., Hutchinson, Minn.

[21] Appl. No.: 638,733

[22] Filed: Jan. 3, 1991

[51] Int. Cl.⁵ .......................................... B23K 26/00
[52] U.S. Cl. ........................... 219/121.68; 219/121.82
[58] Field of Search ................... 219/121.68, 121.69, 219/121.82

[56] References Cited

U.S. PATENT DOCUMENTS 4,724,219  2/1988  Ridinger ............................ 437/19
4,764,485  8/1988  Loughran et al. ................. 437/225
4,786,358  11/1988 Yamazaki et al. ................. 156/643

FOREIGN PATENT DOCUMENTS 0097787  6/1984  Japan ............................ 219/121.69

OTHER PUBLICATIONS

Jeffery P. Sercel, "Optimized Beam Delivery for Industrial Excimer Lasers," Photonics Spectra, Dec. 1991, pp. 84-90.

Primary Examiner—C. L. Albritton
Attorney, Agent, or Firm—Faegre & Benson

[57] ABSTRACT

An excimer laser beam is guided through a moving mask and optics configuration, positioned on computer controlled, synchronously moving stages, to ablate a polyimide substrate. The mask and workpiece move synchronously to enable the ablation of object features on large surface areas without requiring the deactivation and realignment of the laser.

17 Claims, 2 Drawing Sheets

MOVING MASK LASER IMAGING

BACKGROUND OF THE INVENTION

This invention is directed to an improved method and apparatus for using a non-contact mask in a laser system for defining and removing very small, highly detailed image patterns from a polyimide substrate. More particularly it is directed to an imaging system where both the work piece and the mask are moved in the laser beam to allow laser radiation to cover a pattern on the mask that has an area which substantially exceeds the area of the laser beam.

During dual access flex circuit production, a desired conductor pattern is etched into a work piece which is a prepared copper-clad polyimide material such as Dupont's Kapton brand polyimide film, other adhesives or acrylics, photoresists or thin film metals. Typically, protective and base dielectric layers containing drilled or punched holes are laminated to the conductive trace layers to allow access to the leader pads. A polyimide substrate supports the trace layers during the etching and cleaning processes, preventing the trace layers from bending. Later, additional etching, stripping and cleaning processes remove the polyimide substrate supports. However, there are two drawbacks to this process. First, the drilling and punching techniques frequently result in imperfect image patterns (jagged edges, stringers, etc.) for finely patterned features. Second, the etching, stripping and cleaning processes require increased handling which bends and damages the delicate leads and traces.

Consequently, excimer lasing with mask imaging techniques was developed to define and remove very small detailed image patterns from a polyimide substrate. The ablation process is ideal for this highly precise process because it is non-thermal and can be adjusted to remove a polyimide substrate to an exact depth. Currently there are many mask imaging techniques used with an excimer laser process to remove a polyimide substrate. The features and limitations of the prior processes are described below.

The contact conformal mask method involved fanning the laser beam over a mask placed in contact with a polyimide substrate. This method, which is referred to in U.S. Pat. No. 4,764,485, Loughran, et al, has several drawbacks. First, the work piece pattern size and shape depends on the object mask size; that is, the resulting work piece pattern can be no better defined than the machined (or etched) object mask pattern. Second, contamination may be trapped between the mask and substrate. Third, the mask restricts inspection of the image zone on the work piece surface, retarding quality assessment during the imaging process. Fourth, if the contact mask and the work piece do not conform exactly, the image tends to blur. Fifth, use of a contact mask requires manual alignment, which increases labor costs.

In the prior art there are also two non-contact stationary mask methods. The first method involves directing an excimer laser beam through a stationary object mask and stationary focusing lens, which is positioned between the mask and the work piece surface, a polyimide substrate. This concept is discussed in U.S. Pat. No. 4,724,219, Ridinger. Thus, the object mask pattern is magnified to create finely detailed image features on the substrate that are a magnification factor smaller than the details producible on the object mask. The second non-contact method involves directing an excimer laser beam through a focusing lens first, then through a stationary object mask and onto a polyimide substrate. This method is discussed in U.S. Pat. No. 4,786,358, Yamazaki. Thus the object mask pattern is not magnified on the substrate.

Both of the non-contact methods reduce contamination and make it easier to access the work piece surface during the imaging process. However, both have drawbacks when compared to the non-contact moving mask. First, the projected image size in a non-contact stationary mask is confined to the cross-sectional area of the laser beam. Second, there is an increased chance of damaging the mask from continual impact of the laser beam on one location of the mask.

In the prior art there is also a technique which uses a non-contact mask which can be moved when the laser is not activated. Such a non-contact mask method with a movable mask held stationary when lasing commences provides results which are improved over the non-contact stationary mask method because the size of the work piece image is not limited by the size of the cross-sectional area of the laser beam. However, there are several drawbacks to this prior art method as well.

First, because the mask cannot move during the lasing process, the laser must be deactivated and the mask repositioned before lasing can resume. Consequently, to ensure that the image pattern on the mask, and hence, the work piece surface, receives 100% ablative coverage, the beam is overlapped on the image pattern of the mask and work piece surfaces. Excessive energy input from the laser beam at these overlap areas may damage the mask and lead to excessive energy applied to the work piece surface. Second, the process of halting the laser and repositioning the mask is also more time consuming.

Finally, two prior art non-contact "moving" mask methods are briefly described in "Why Excimer Lasers Excel in Marking", by Sercel, et al. The first method involves directing a laser beam through a mask that moves along one axis (left to right), and projects the image onto a counter-correlated moving target surface. The second method does not actually use a "moving" mask; however, the effect is similar. The second method involves directing a laser beam through a turning mirror that moves along one axis (up and down) in front of a stationary mask, so the beam scans over the mask, projecting the mask object image onto a work piece. However, there are several drawbacks to both methods. First, for both methods there is only one axis of movement (left or right for the first method, and up and down for the second method). In the second method, the single axis of movement and thus the projected image size, is limited by the diameter of the imaging lens.

BRIEF DESCRIPTION OF THE INVENTION

A machine according to the present invention is an improvement upon prior machines for defining and removing small image patterns from a work piece which included apparatus for directing a laser beam through a portion of a mask bearing a pattern of the image to be applied to the work piece and further apparatus for magnifying the image pattern for projection onto the surface of the work piece. The present invention includes improved structure for forming patterns on the work piece which are substantially larger than the area illuminated by the laser. The improvement includes means for supporting the mask for movement transverse to the axis of the laser beam, means for supporting the work piece for movement transverse to the axis of the laser beam, and control means for moving the mask and work piece in synchronism relative to the laser beam thereby exposing all of the portions of the image on the mask to ablate the work piece in accordance with the image pattern of the mask.

The method of the present invention is an improvement upon prior methods for defining and removing small image patterns from a work piece which included the steps of directing a laser beam through a portion of a mask etched with a pattern of the image to be applied to the work piece and magnifying the image pattern for projection onto the surface of the work piece. The improved method includes the further steps of mounting the mask for movement transverse to the axis of the laser beam, mounting the work piece for movement transverse to the axis of the laser beam and moving the mask and work piece in synchronism with each other to expose all of the portions of the image on the mask thereby ablating the work piece in accordance with the pattern of the image from the mask.

Accordingly, it is an object of the present invention to provide an apparatus and method that dramatically increases the imaging area while still maintaining the image clarity and sharpness.

It is another object of the present invention to provide an imaging system which does not require repetitive manual alignment steps to allow exposure of an image from a mask having an image pattern substantially greater in area than the area of the laser beam.

It is a still further object to provide an imaging system where the object mask pattern is magnified on the substrate and not limited to the cross sectional area of the laser beam.

It is a further object of the invention to provide an imaging system where the magnification of the object mask pattern on the substrate may be varied in accordance with specific design criteria.

Lastly, it is an object to provide an imaging system where the non-contact mask is movable while the laser is activated.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood with reference to the following description taken in connection with the accompanying drawings in which:

DETAILED DESCRIPTION OF THE PREFERRED EMBODIMENT

Figure 1:
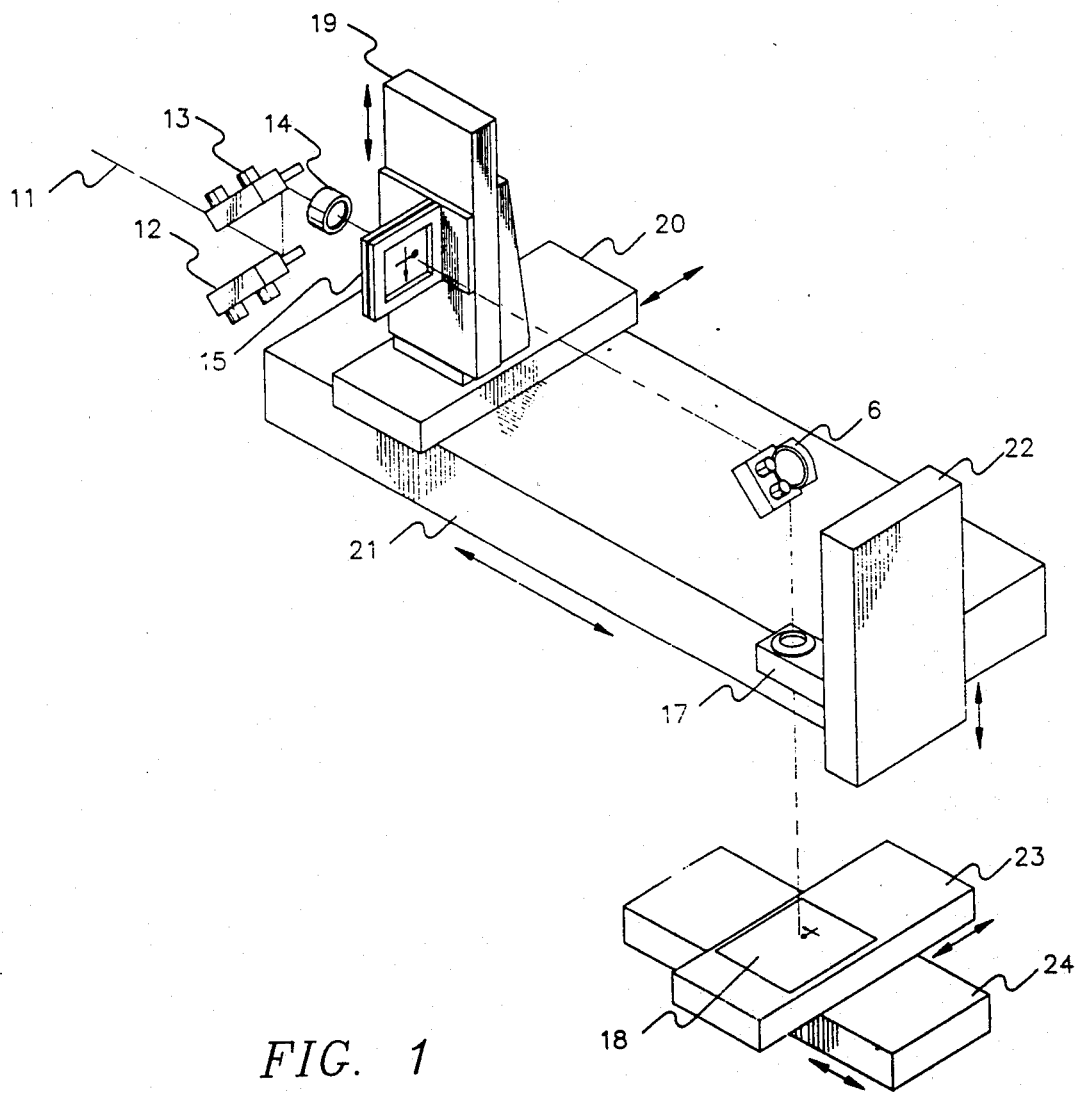
FIG. 1 is an illustration of a preferred embodiment of the actual moving mask projection imaging apparatus.

Referring now to the drawings, FIG. 1 illustrates the optics and table system of the preferred embodiment of the present invention and its operation. The optics components (turning mirrors, field lens, mask, focusing lens) and their configuration are comparable to industry standards for state of the art excimer laser systems and are therefore not discussed in detail. For purposes of explaining the present apparatus, the synchronous relationships between the various axes are: X-U, Y-V, Z-W, according to standard industry practice.

The laser beam 11 emitted by an excimer laser, not illustrated herein, enters the first of three 45° angled turning mirrors 12. Mirror 12 bends beam 11 through an angle of 90° to guide it into a second turning mirror 13 which in turn bends beam 11 through an additional 90° and guides the beam squarely into a field lens 14. The diameter of field lens 14 must be large enough to handle the entire cross-sectional area of laser beam 11.

Beam 11 is then directed through a mask 15, which is made from a non-ablatable sheet material such as a copper sheet with an etched pattern of the desired work piece image that is positioned on a vertical mask V axis stage 19. Mask 15 could also be made from stainless steel or other suitable materials. Beam 11 then strikes a surface section of mask 15 equal to the cross-sectional area of the beam. The vertical mask V axis stage 19 is positioned on top of the horizontal mask U axis stage 20, which moves parallel to and synchronously with a horizontal work piece X axis stage 23. Horizontal mask U axis stage 20 is positioned on top of the horizontal mask focusing W axis stage 21, which moves synchronously with the vertical focusing lens Z axis stage 22 to allow for altering the magnification during the imaging process.

The pattern image on mask 15 at the zone where beam 11 strikes the mask is guided into third turning mirror 16 which turns the projected image 90° into focusing lens 17, mounted on vertical focusing lens Z axis stage 22, which moves perpendicular to the horizontal mask W axis stage 21. Focusing lens 17 inverts, magnifies and projects the image onto the work piece surface 18, which is positioned on the horizontal work piece X axis stage 23, which is positioned on the horizontal work piece Y axis stage 24.

Figure 2:
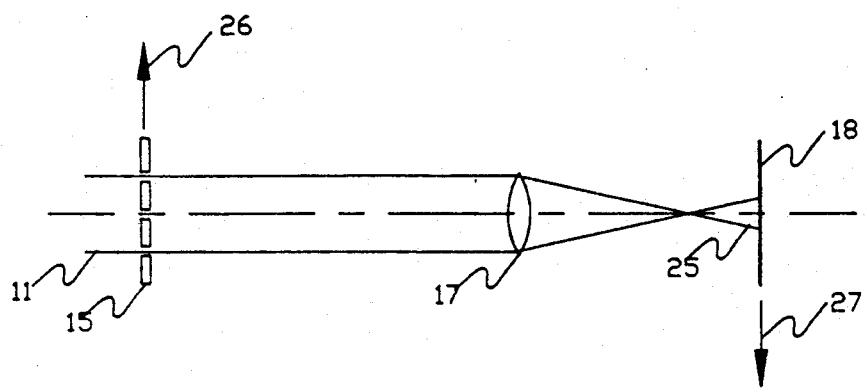
FIG. 2 illustrates how the object mask and work piece surface move relative to one another during the imaging process.

Given the following:
O=Object distance from mask 15 to focusing lens 17
F=Focal length of focusing lens 17
I=Image distance from focusing lens 17 to work piece surface 18
M=Object Magnification The simple thin lens formula describing the system is:
$M = I/O$
$I = F^*M + F$
$O = F^*(1 - 1/M)$ FIG. 2 illustrates how mask 15 and work piece surface 25 move relative to one another during the imaging process. The movement along vector 26 illustrates how mask 15 moves in the opposite direction 27 of work piece 18, as a result of focusing lens 17 inverting the object mask image. Referring to FIG. 1 it can be seen how the object mask image is inverted on work piece surface 18. Mask 15 moves (diagonally, vertically or horizontally, according to its programmed pattern), exposing a section of the mask object image to the continuously activated pulsing laser beam. Synchronously, work piece surface 18 moves with the mask 15, in the opposite direction, as indicated in FIG. 2, allowing the identically patterned, but magnified zone of object image 25 to be ablated from the work piece surface 18.

The smooth, synchronous movement of the mask and the work piece surface creates a sweeping effect, so the beam does not strike the same zone on the mask or work piece surface repeatedly. Motion control vectorial velocity commands provide the precision required to match the speeds and distances between the horizontal and vertical mask axis stages 20 and 19 and the horizontal work piece axis stages 23 and 24. The moving mask method of the present invention is an improvement on the standard industry practice of synchronizing one X and one Y table to create a diagonal movement within a single plane.

To synchronize the speeds of the horizontal mask U axis and vertical mask V axis stages 20 and 19 and horizontal work piece X axis and horizontal work piece Y axis stages 23 and 24, the translational speeds must be related by the value of the object magnification. For example, if the object magnification were 0.5, the work piece X & Y axis stages 23 and 24 should each move half as far and half as fast as the mask U and V axes stages 20 and 19 to pattern a sharp focused image on the work piece surface 18.

During the imaging process, mask 15 must not go out of parallel with work piece surface 18. Any angle from parallel results in image smear on the work piece surface along the direction of displacement. Also, the distance between mask 15 and focusing lens 17 must remain proportional to the distance between focusing lens 17 and work piece surface 18 to keep the magnification constant during the imaging process.

Horizontal mask focusing W axis stage 21 is synchronized with the vertical focusing lens Z axis stage 22 by vectorial velocity commands. The computer controlled stages allow a wider variety and a significantly quicker and more precise adjustment of the distance between mask 15 and focusing lens 17, and work piece surface 18. Thus, the magnification incident on the work piece surface can be altered (through software commands) during the imaging process.

As discussed above the present invention provides greatly increased performance advantages by providing separate and synchronized, two dimensional, movement of both a non-contact mask and a substrate while the laser is activated, so a significantly larger area of substrate can be processed without deactivating the laser before repositioning the mask and substrate. A further concept of the present invention includes the means for controlling and synchronizing the movement of the mask, focusing lens and substrate to account for magnification of the object mask at the substrate.

From the above, it should be appreciated that all of the aforementioned objects are achieved by the process and apparatus of the present invention. In particular, it is seen that a moving mask and moving work piece process is described for removing image patterns from work pieces such as copper clad polyimide substrates, other adhesives or acrylics, photoresists or thin film metals.

While the invention has been described in detail herein in accordance with certain preferred embodiment thereof, many modifications and changes thereof may be effective by those skilled in the art. Accordingly it is intended by the appended claims to cover all such modifications and changes as fall within the true spirit and scope of the invention.

I claim:

1. In a method for defining and removing small image patterns from a work piece which includes the steps of directing a laser beam through a portion of a mask etched with two dimensional pattern of the image to be applied to the work piece and magnifying the image pattern with a focusing lens for projection onto the surface of the work piece, the improvement which comprises the steps of:
   a. mounting the mask for movement transverse to the axis of the laser beam;
   b. mounting the work piece for movement transverse to the axis of the laser beam; and
   c. moving the mask and work piece in synchronism with each other to expose all of the portions of the image on the mask thereby ablating the work piece in accordance with the pattern of the image from the mask.

2. The invention of claim 1 wherein the mask is moved along the axis of the beam of light in coordination with the focusing lens thereby changing the magnification of the image on the work piece relative to the pattern of the image of the mask, thereby facilitating selectively changing the size of selected features of the design and increasing the detail which can be applied to the work piece.

3. The invention of claim 1 wherein the moving of the mask and the moving of the work piece occurs simultaneously in multiple axes transverse to the axis of the laser beam.

4. The method of claim 1 wherein the movement of the mask and work piece is continuous and occurs while the laser beam remains activated.

5. The method of claim 1 wherein the area of the portion of the work piece pattern irradiated by the laser at any point in time is very small relative to the size of the entire pattern.

6. The method of claim 1 wherein the work piece is moved while the mask remains stationary to increase the relative size of the image on the work piece relative to the size of the image on the mask.

7. The invention of claim 1 wherein the laser is an excimer laser.

8. A machine for defining and removing small image patterns from a work piece which includes apparatus for directing a laser beam through a portion of a mask bearing a pattern of the image to be applied to the work piece and further apparatus for magnifying the image pattern for projection onto the surface of the work piece, improved structure for forming patterns on the work piece which are substantially larger than the area illuminated by the laser, the improvement comprising:
   a. means for supporting the mask for movement transverse to the axis of the laser beam;
   b. means for supporting the work piece for movement transverse to the axis of the laser beam; and
   c. control means for moving the mask and work piece in synchronism relative to the laser beam thereby exposing all of the portions of the image on the mask to ablate the work piece in accordance with the image pattern of the mask.

9. The invention of claim 8 wherein the movement of the mask and work piece occurs in a single axis.

10. The invention of claim 8 wherein the movement of the mask and work piece occurs in two axes.

11. The invention of claim 8 wherein the work piece has an ablatable surface.

12. The invention of claim 11 wherein the ablatable surface is a polyimide substrate.

13. The invention of claim 11 wherein the ablatable surface is selected from the groups comprised of adhesives, acrylics, photoresists or thin film metals.

14. The invention of claim 8 wherein the mask is a non-ablatable metallic sheet.

15. The invention of claim 14 wherein the non-ablatable metallic sheet is a copper sheet with an etched pattern.

16. The invention of claim 14 wherein the non-ablatable metallic sheet is made from stainless steel.

17. The invention of claim 8 wherein the laser is an excimer laser.

* * * * *

UNITED STATES PATENT AND TRADEMARK OFFICE
CERTIFICATE OF CORRECTION

PATENT NO. : 5,160,823

DATED : November 3, 1992

INVENTOR(S) : Jeffry S. Bennin and Mark O. DuStrude

It is certified that error appears in the above-identified patent and that said Letters Patent is hereby corrected as shown below:

Column 4, line 48, after "0=F*(1", delete "-" and insert

-- + --

Signed and Sealed this

Fifth Day of October, 1993

Attest:

BRUCE LEHMAN

*Attesting Officer*     *Commissioner of Patents and Trademarks*